United States Patent [19]

Herbenar

[11] 4,102,585
[45] Jul. 25, 1978

[54] BALL JOINT

[75] Inventor: Edward John Herbenar, Birmingham, Mich.

[73] Assignee: TRW Inc., Cleveland, Ohio

[21] Appl. No.: 807,113

[22] Filed: Jun. 16, 1977

[51] Int. Cl.² .......................... F16C 11/00; F16D 1/12
[52] U.S. Cl. .................................... 403/138; 403/144; 403/361; 308/72; 308/135; 29/149.5 B
[58] Field of Search ............... 403/124, 125, 133, 138, 403/135, 144; 308/72, 135; 29/149.5 B, 149.5 C, 149.5 NM

[56] References Cited

U.S. PATENT DOCUMENTS

| 2,708,590 | 5/1955 | Latzen | 403/135 X |
| 3,058,765 | 10/1962 | Thomas | 403/133 |
| 3,101,961 | 8/1963 | White | 403/135 X |
| 3,418,011 | 12/1968 | Scheublein et al. | 403/125 |
| 3,571,880 | 3/1971 | Andrew | 29/149.5 B |

FOREIGN PATENT DOCUMENTS 300,377  10/1954  Switzerland ................. 403/135

Primary Examiner—Wayne L. Shedd

[57] ABSTRACT

An improved pivot joint includes a ball stud which cooperates with a bearing seat. Axially directed load forces applied to a shank portion of the ball stud are transmitted to the bearing seat. Static friction force between the bearing seat and a sidewall of the socket chamber is sufficient to hold the bearing seat against axial movement under the influence of the axial load forces. In another embodiment of the invention, the angle at which the load forces are transmitted to the bearing seat is such that the static friction forces between the bearing seat and the socket wall are ineffective to hold the bearing seat against axial movement. Therefore, the friction forces must be supplemented by a spring force to maintain the head portion of the ball stud seated. In both embodiments of the invention, the bearing seat is constructed so as to promote a wedging action between the bearing seat and the side surface of the socket chamber. To promote the wedging action, the bearing seat has an annular inner surface with a radius of curvature which is greater than the radius of curvature of a generally spherical outer surface of the head of the ball stud.

15 Claims, 3 Drawing Figures

4,102,585

BALL JOINT

BACKGROUND OF THE INVENTION

The present invention relates to an improved pivot joint and more specifically to a pivot joint having a wedging action between the bearing seat and the side wall of a socket chamber to retard movement of the bearing seat under the influence of loads applied to a ball stud.

A known pivot joint having a ball stud with a head end portion which engages a bearing seat is disclosed in U.S. Pat. No. 3,168,339. The bearing seat disclosed in this patent is freely slidable relative to the side wall of a socket chamber. To prevent unseating of the head end of the ball stud under the influence of load forces applied to the stud, a relatively strong compression spring is utilized to press the bearing seat against the ball stud. The relatively large spring preload force applied against the bearing seat and ball stud tends to hold the ball stud against oscillation or rotation relative to the socket housing in a manner which is undesirable when the pivot joint is used in many environments.

SUMMARY OF THE PRESENT INVENTION

An improved pivot joint constructed in accordance with the present invention minimizes the spring preload forces required to maintain the head end of a ball stud seated in a socket chamber. In one embodiment of the invention, this is accomplished by utilizing friction forces between an outer side surface of the bearing seat and a side wall of the socket chamber to hold the bearing seat against movement under the influence of axial load forces. When an axially directed force is applied against the shank of the ball stud, the radial forces transmitted between the outer surface of the ball stud head and the inner surface of the bearing seat are relatively close to the equator of the ball stud head so that a relatively large radial force component extends at a small acute angle relative to the line of action of the load forces on the inner surface of the bearing seat. This results in the tangent of the acute angle being either equal to or smaller than the coefficient of friction between the outer side surface of the bearing seat and the side wall of the socket chamber. The radial force component multiplied times the coefficient of friction determines the friction forces between the bearing seat and side wall of the socket chamber. These friction forces are equal to or greater than the axially downwardly component of force applied against the bearing seat when the coefficient of friction is equal to or greater than the tangent of the acute angle between the line of action of the load force and the radial force component.

Due to manufacturing tolerances commonly utilized in making pivot joints, it may be rather difficult to reliably construct pivot joints with a very small acute angle between the line of action of the load forces applied to the bearing seat and the radial load force component. When the tangent of this angle exceeds the coefficient of friction between the bearing seat and socket chamber side wall, the static friction force between the bearing seat and the side wall of the socket chamber is insufficient to hold the bearing seat against axial movement. In these instances, it is contemplated that the friction force will be supplemented by a spring force. However, the magnitude of the spring force and the preload applied to the head end portion of the ball stud is minimized by forming the bearing seat in such a manner as to tend to maximize the static friction force between the bearing seat and the side wall of the socket chamber.

In order to tend to maximize the static friction force between the bearing seat and the side wall of the socket chamber, the bearing seat is constructed so as to promote a wedging action between the bearing seat and the side wall of the socket chamber. To this end, the inner surface area on the bearing seat has a radius of curvature which is greater than the radius of curvature of the outer surface of the head of the ball stud. This results in the formation of an arcuate wedge shaped space between at least a portion of the surface area on the bearing seat and the head portion of the ball stud. This wedge shaped space tapers toward the equator of the ball stud so as to promote a radially outward camming action between the head portion of the ball stud and the bearing seat upon the application of axial load forces to the shank portion of the ball stud.

Accordingly, it is an object of this invention to provide a new and improved pivot joint which minimizes the spring peload forces required to hold a bearing seat in engagement with the head end portion of a ball stud upon the axial loading of the ball stud.

Another object of this invention is to provide a new and improved pivot joint having a bearing seat which is held against axial movement relative to the side wall of a socket chamber by friction forces between the bearing seat and the side wall of the socket chamber.

Another object of this invention is to provide a new and improved pivot joint having a bearing seat with an inner surface which engages the head of a ball stud and has a radius of curvature which is greater than the radius of curvature of the head of the ball stud to promote a wedging action between the bearing seat and the side surface of a socket chamber.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
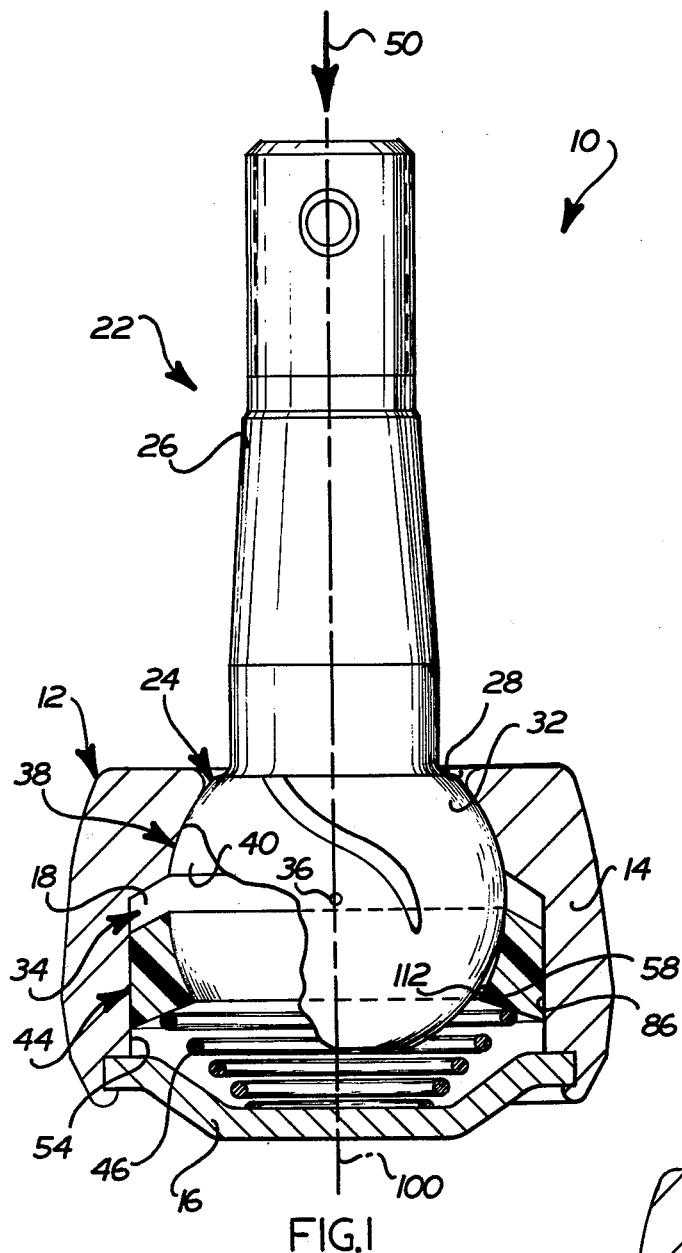
FIG. 1 is a partially broken away sectional view of a pivot joint constructed in accordance with the present invention.

A ball joint 10 constructed in accordance with the present invention is illustrated in FIG. 1. The ball joint 10 includes a rigid metal housing 12 having a generally cylindrical side wall 14 which cooperates with a circular end plate 16 to define a generally cylindrical socket chamber 18. A ball stud 22 has a spherical head end portion 24 disposed in the socket chamber 18. A shank portion 26 of the ball stud 22 extends outwardly from the head end portion 24 through a circular opening 28 in the housing 12. The head end portion 24 of the ball stud 22 has a generally spherical outer surface 32 which engages a bearing arrangement 34. The bearing arrangement 34 supports the ball stud 22 for rotation and limited tilting movement about a center of oscillation 36 which is coincident with the center of the spherical head portion.

The bearing arrangement 34 includes an annular upper bearing seat 38 which is integrally formed with the socket housing 14 and has an inner surface 40 which abuttingly engages the spherical outer surface 32 of the head portion 24 of the ball stud. The bearing seat surface 40 has a radius of curvature which is the same as the radius of curvature of the stud head portion 24. In addition, the bearing arrangement 34 includes an annular lower bearing seat 44. A spiral coil spring 46 acts between the closure plate 16 and the lower bearing seat 44 to hold the lower bearing seat in abutting engagement with the head portion 24 of the ball stud 22.

In accordance with one feature of the present invention, the coil spring 46 is relatively weak and exerts only sufficient force against the lower bearing seat 44 to support the bearing seat in abutting engagement with the head end portion 24 of the ball stud 22. This tends to minimize the preload forces applied to the lower bearing seat 44 and ball stud 22. Therefore, the head end portion 24 of the ball stud is free to tilt and rotate in the socket chamber 18 about the center of oscillation 36.

Although it is desirable to have the spring 46 apply a relatively small preload force to the lower bearing seat 44, it is necessary to maintain the head end portion 24 of the ball stud in abutting engagement with the upper bearing seat 36 upon the application of axial load forces 50 to the ball stud 22. In accordance with another feature of the present invention, the bearing seat 44 cooperates with the head end portion 24 of the ball stud and the socket housing 12 to hold the ball stud against movement under the influence of axial load forces applied to the shank 26 of the ball stud. To retard movement of the lower bearing seat 44, it is constructed so as to tend to maximize the static friction force between the bearing seat and the socket side wall 14. In addition the bearing seat 44 is constructed to promote a wedging action between the bearing seat and a cylindrical inner side surface 54 of the socket chamber 18.

To promote this wedging action, the lower bearing seat 44 is provided with an annular inner surface 58 which encircles the head portion 24 of the ball stud. The annular inner bearing surface 58 has an arcuate cross sectional configuration when viewed in a radial plane (see FIG. 2). The radius of curvature of the inner bearing surface 58 is greater than the radius of curvature of the spherical head portion 24 of the ball stud. Thus, the center of curvature of the spherical head portion of the ball stud is coincident with the center of oscillation 36. The center of curvature of the radial section of the bearing seat is indicated at 60 in FIG. 2. This results in a relatively large radius of curvature, indicated by the arrow 62 in FIG. 2, for the inner surface 58 of the bearing seat 44 while the spherical head portion 24 of the ball stud has a relatively small radius of curvature, indicated by the arrow 64 in FIG. 2.

Figure 2:
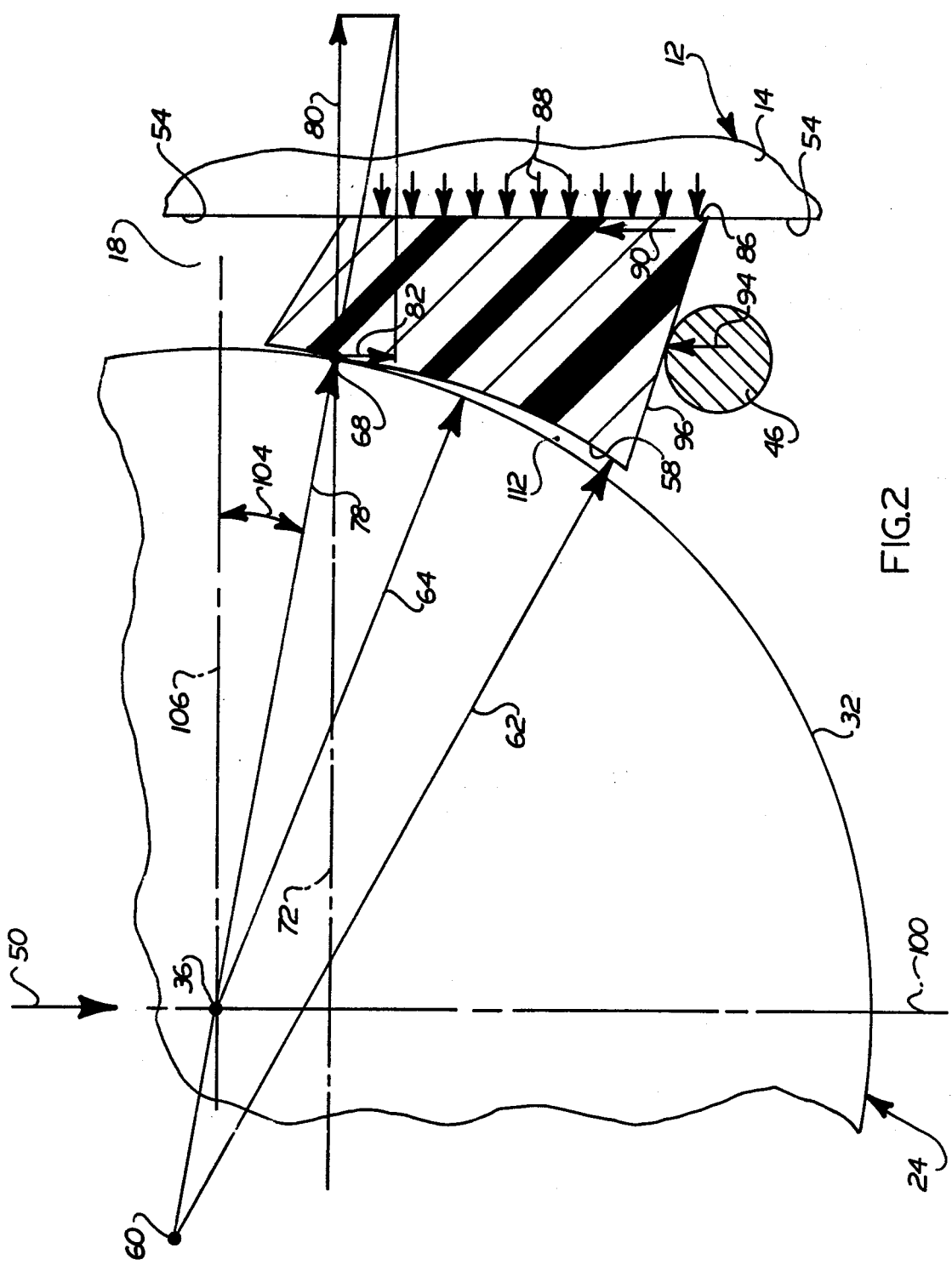
FIG. 2 is an enlarged schematized illustration depicting the relationship between the head end of a ball stud, bearing seat, and socket chamber side wall of the pivot joint of FIG. 1.

The relatively large radius of curvature of the bearing surface 58 results in the bearing seat tapering upwardly (as viewed in FIG. 2) so that the point of tangency between the inner surface 58 of the bearing seat 44 and the spherical outer surface 32 of the ball stud head portion 24 occurs close to the equator of the stud head portion 24 at the point indicated at 68 in FIG. 2. The arcuate bearing surface 58 tapers away from the outer side surface 32 of the ball stud head portion 24 on opposite sides of the tangency point 68. The annular bearing seat surface 58 is generated by rotating the arcuate radial section illustrated in FIG. 2 about the center of oscillation 36 of the ball stud 22. This results in the formation of a circular central line or axis 72 of tangential engagement between the surface 58 of the bearing seat and the ball stud head portion.

The circular line 72 of tangential engagement between the inner surface 58 of the bearing seat 44 and the outer side surface 32 of the ball stud head portion 24 is disposed relatively close to the equator of the ball stud head portion. Therefore the downward force 50 is transmitted from the head portion 24 of the ball stud to the bearing seat through a conical plane having its apex at the center of oscillation 36 of the ball stud. The base of the conical force transmission plane terminates at the circular line 72. When viewed at any one radial section of the conical force transmission plane, this results in the transmission of a load force 78 (FIG. 2) from the head portion 24 of the ball stud to the lower bearing seat 44.

The force transmitted to the bearing seat 44 has a relatively large radial component 80 and a relatively small axial component 82. The relatively large radial force 80 presses a cylindrical outer side surface 86 of the lower bearing seat 44 firmly against the cylindrical side surface 54 of the housing side wall 14. The force applied by the outer side surface of the bearing seat 44 against the inner side surface 54 of the socket chamber 18 results in a sideward reaction force 88 and an upwardly directed static friction force 90 on the annular bearing seat 44. The summation of the friction forces 90 around the cylindrical outer surface 86 of the annular bearing seat 44 is equal to the downward load force 50 and to the summation of the axial force components 82. Therefore, the bearing seat 44 is firmly held in place by the friction force and will not move downwardly in the socket chamber 18.

Downward movement of the bearing seat 44 in the socket chamber 18 is also opposed by an upwardly directed spring force 94 exerted against a conical lower surface 96 of the bearing seat 44. However, since the spring 46 is weak and is effective to merely support the bearing seat when the joint 10 is unloaded, the upwardly directed spring force can be treated as being negligible. Therefore, the bearing seat 44 is effectively held against downward movement in the socket chamber 18 by only the friction force 90 between the outer side surface 86 of the bearing seat and the inner side surface 54 of the socket chamber. It should be noted that the ball joint 10 is free of retaining ridges, pins or similar devices to hold the bearing seat in position.

The friction force 90 between the bearing seat 44 and housing side wall 14 is equal to the product of the radial force 80 times the coefficient static friction between the bearing seat 44 and housing side wall. The lower the point of contact between the arcuate inner side surface 58 of the bearing seat 44 and the spherical side surface of the ball stud head 24, the smaller is the radial force component 80. To obtain a friction locking action between the bearing seat 44 and the socket side wall 14 under the influence of an axial force applied to the ball stud, the point 68 (FIG. 2) at which the arc of curvature of the bearing seat 58 is tangential to the spherical surface of the ball stud 32 should be as close to the equator of the ball stud as possible while still providing the necesssary support for the ball stud.

The lowest position of the point of contact 68 consistant with obtaining a friction locking action between bearing seat and socket side wall can be determined from the geometry of the ball joint 10 and the coefficient of friction between the bearing seat and socket side wall. The circular line of contact 72 between the bearing seat 44 and the surface 32 of the ball stud has a central longitudinal axis which is coincident with a central axis 100 of the socket chamber 18 and extends through the center 36 of oscillation. The circular line 72 lies in a plane which extends perpendicular to the central axis 100 of the socket chamber 18 and to the cylindrical outer side surface 54 of the socket chamber. The radially outwardly and downwardly force components 78 resulting from the axial force load 50 in the shank 26 of the ball stud extend at an acute angle 104 formed between the line of action of the load force component 78 and a second plane 106 which extends parallel to the plane containing the circular axis or line of contact 72 between the outer side surface of the ball stud head 24 and the bearing seat 44. The line of action of the load force 78 extends through the center 36 of oscillation and through the tangency point 68. The acute angle between the line of action of the load force 78 and the radial force component 80 is equal to the angle 104.

The radial and axial force components 80 and 82 applied to the bearing seat 44 are related to each other as a function of the tangent of the angle 104. Thus, the axial component 82 is equal to the radial component 80 times the tangent of the angle 104. In order to have the friction force 90 hold the bearing seat against axial movement in the socket chamber 18, the friction force 90 must be at least as great as the axial force 82. Assuming a friction locking action, the friction force 90 would be equal to the radial force 80 times the tangent of the angle 104. The friction force 90 is also equal to the coefficient of static friction between the cylindrical outer side surface 86 of bearing seat 44 and the cylindrical side surface 54 of the socket chamber 18. Therefore, when the axial force 82 is equal to the friction force 90, the tangent of the angle 104 is equal to or less than the coefficient of static friction between the bearing socket side surface 86 and the side surface 54 of the socket chamber.

If the tangent of the angle 104 exceeds the coefficient of friction between the bearing seat 44 and socket wall 14, the axial force 82 exceeds the friction force 90 and the bearing seat 44 will move downwardly in the socket chamber. However, if the angle 104 is sufficiently small so that its tangent is less than the coefficient of friction between the bearing seat 44 and side surface 54 of the socket chamber, the axially upwardly directed friction force 90 is equal to the axially downwardly directed force component 82. The bearing seat 44 is then held against downward movement in the socket chamber by the friction forces between the bearing seat and the side surface 54 of the socket chamber.

The coefficient of static friction between the bearing seat 44 and side surface 54 of the socket chamber varies as a function of the materials out of which the bearing seat 44 is made and the amount of lubricant between the bearing seat 44 and chamber side wall surface 54. However, it is believed that for most commonly used bearing seat materials, such as nylon or "Delrin," slippage will not occur between the bearing seat 44 and socket side wall surface 54 if the angle 104 is 10° or less. In one specific instance using a bearing seat formed of a polymeric material in association with a steel socket side wall 14, slippage first occurred when the angle 104 was equal to approximately 18°.

In forming the inner bearing surface 58, an arcuate radial section (such as shown in FIG. 2) is generated from a center of curvature 60 located along a line extending through the center of oscillation 36 of the stud head and the point 68 of contact between the inner bearing surface 58 and the stud head. The center of curvature 60 is offset from the center of oscillation 36 on the same side of a plane 106 as the shank 26 of the ball stud and on the side of the plane 106 opposite from the plane containing the circular line 72 of tangential contact between the annular inner surface 58 of the bearing seat 44 and the stud head. This results in the formation of an arcuate wedge shaped space 112 between the bearing seat 44 and the outer surface 32 of the stud head 24.

The arcuate wedge shaped space 112 tapers upwardly to the circular line 72 of tangential contact between the bearing seat and stud head 24. A similar wedge shaped space is formed between the surface 62 and the outer side surface 32 of the stud head on the opposite side of the line 72 of tangential contact. Since the inner surface 58 of the bearing seat 44 is generated by rotating the arcuate section shown in FIG. 2 about the center 36, the wedge shaped space 112 has an annular configuration and extends completely around the stud head 24.

As the bearing seat 44 wears under the influence of forces applied to the ball joint, the wear tends to equalize itself on opposite sides of the line 72 so that an annular band of wear having its center at the circular line 72 is formed around the outer surface of the stud head 24. Since the center of the area of pressure engagement between the bearing seat 44 and the spherical outer side surface 32 of the stud head 24 remains substantially at the circular line 72, the load force 78 has an effective line of action which remains substantially the same.

In the embodiment of the invention illustrated in FIGS. 1 and 2, the bearing seat 44 was accurately formed to maintain the tangent of the angle 104 less than the coefficient of static friction between the bearing seat 44 and the side wall 14 of the socket chamber. It is contemplated that cost considerations may dictate the provision of manufacturing tolerances which may, in the case of certain joint assemblies, prevent the bearing seat 44 from being formed accurately enough to maintain a relatively small angle 104. Such a joint assembly has been illustrated in FIG. 3. Since the embodiment of the invention illustrated in FIG. 3 is substantially similar to the embodiment of the invention illustrated in FIG. 1, similar numerals will be utilized to designate similar components, the suffix letter "a" being utilized in association with the numerals of FIG. 3 in order to avoid confusion.

Figure 3:
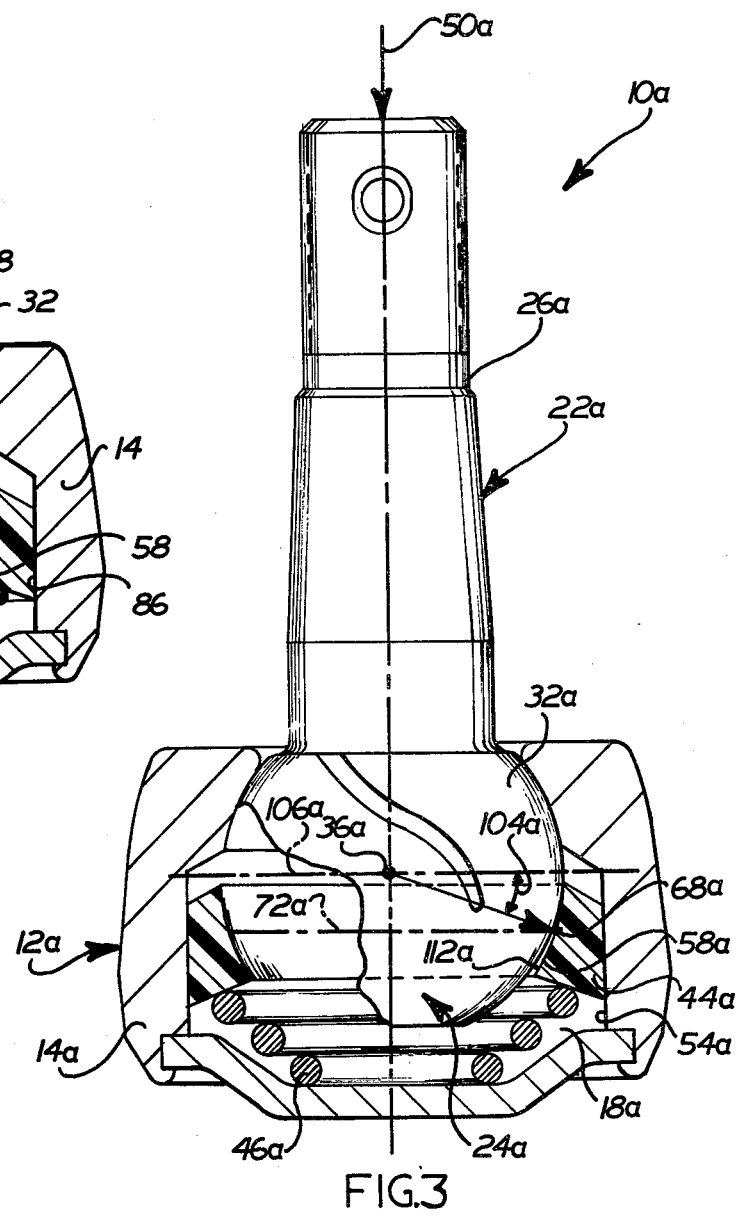
FIG. 3 is a partially broken away sectional view, generally similar to FIG. 1, of a second embodiment of the invention in which the friction forces between the bearing seat and the side wall of the socket chamber are insufficient to hold the bearing seat against axial movement in the socket chamber.

In the embodiment of the invention illustrated in FIG. 3, the annular bearing seat 44a has an annular inner surface 58a which has a point of contact 68a with the spherical head portion 24a of a ball stud 22a. It should be noted that circular line 72a of tangential contact between the bearing seat 44a and the spherical head portion 24a of the ball stud 22a is displaced a substantial distance away from the center of oscillation 36a. This results in a relatively large angle 104a between a plane 106a and a line extending through the center oscillation 36a and the point 68a of tangential contact between the head 24a of the ball stud and bearing seat 44a.

The relatively large angle 104a has a tangent which is greater than the coefficient of friction between the bearing seat 44a and the inner side surface 54a of the socket chamber 18a. Therefore, the friction force applied to the bearing seat is insufficient to resist the axial force component which is applied to the bearing seat by an axial load on the shank 26a of the ball stud 22a. In order to supplement the relatively small friction force between the bearing seat and side wall of the socket chamber, a relatively stronger spring 46a is utilized.

Although the friction force between the bearing seat 44a and the side wall of the socket chamber 18a is ineffective to provide a friction locking action for the bearing seat, the annular inner surface 58a of the bearing seat 44a is formed in the same manner as previously explained in connection with the embodiment of the invention illustrated in FIGS. 1 and 2. Therefore, the annular inner surface 58a has an arcuate radial section with a radius of curvature which is greater than the radius of curvature of the spherical head portion 24a of the ball stud 22a. This results in the bearing seat 44a having a generally tapered configuration to promote a locking wedging action between the bearing seat 44a and the side surface 54a of the socket chamber 18a. This configuration of the bearing seat 44a results in the formation of an annular arcuate wedge space 112a between the inner side surface 58a of the seat 44a and the head portion 24a of the ball stud. The space 112a tapers toward the equator of the spherical head 24a to the point of contact 68a between the inner surface 58a of the bearing seat 44a and the stud head. The relatively large radius of curvature of the surface 58a promotes wedging action between the bearing seat 44a and socket side wall 14a to minimize the spring force required to maintain the stud head portion 24a seated against the influence of the axial load 50a.

In view of the foregoing, it is apparent that the ball joints 10 and 10a minimize the spring preload forces required to maintain the head end of a ball stud seated in a socket chamber. In the ball joint 10, this is accomplished by utilizing friction forces between an outer side surface 86 of the bearing seat 44 and a side wall 14 of the socket chamber 18 to hold the bearing seat against movement under the influence of the axial load forces. When an axially directed load force 50 is applied against the shank 26 of the ball stud, the radial forces transmitted between the outer surface 32 of the ball stud head 24 and the inner surface 58 of the bearing seat 44 are relatively close to the equator of the ball stud head so that a relatively large radial force component 80 extends at a small acute angle 104 relative to the line of action of the load force 78 on the inner surface of the bearing seat. This results in the tangent of the acute angle 104 being either equal to or smaller than the coefficient of friction between the outer side surface 86 of the bearing seat 44 and the side wall 14 of the socket chamber. The radial force component 80 multipled times the coefficient of friction determines the friction force 90 between the bearing seat 44 and side wall 14 of the socket chamber 18. These friction forces are equal to or greater than the axially downward force applied against the bearing seat 44. Therefore, the bearing seat 44 does not move in the socket chamber under the influence of the axial load forces.

Due to manufacturing tolerances commonly utilized in making pivot joints, it may be rather difficult to reliably construct pivot joints with a small acute angle between the line of action of the load force 78 applied to the bearing seat 44 and the radial force component 80. When the tangent of this angle exceeds the coefficient of friction between the bearing seat 44 and socket chamber side wall the static friction force between the bering seat and the side wall of the socket chamber is insufficient to hold the bearing seat against axial movement. In these instances, it is contemplated that the friction force will be supplemented by a spring force (see FIG. 3). However, the magnitude of the spring force and the preload applied to the head end portion of the ball stud is minimized by forming the bearing seat in such a manner as to tend to promote a wedging action between the bearing seat and the side wall of the socket chamber.

In order to tend to maximize the static friction forces between the bearing seats 44 and 44a and the side walls 14 and 14a of the socket chambers, the bearing seats are constructed so as to promote a wedging action between the bearing seats and the side wall of the socket chamber. To this end, the inner surface areas 58 and 58a on the bearing seats 44 and 44a have radii of curvature whih are greater than the radii of curvature of the spherical outer surfaces of the heads 24 and 24a of the ball studs 22 and 22a. This results in the formation of arcuate wedge shaped spaces 112 and 112a between at least a portion of the surface area on the bearing seats 44 and 44a and the head portions of the ball studs. The wedge shaped spaces 112 and 112a taper toward the equator of the ball studs so as to promote a radially outward camming action between the head portions 24 and 24a of the ball studs and the bearing seats 44 and 44a upon the application of axial load forces to the shank portions of the ball studs.

Having described specific preferred embodiments of the invention, the following is claimed:

1. A pivot joint comprising a housing defining a socket chamber having a side surface, a ball stud having a head portion disposed in said socket chamber and a shank portion to which axial load forces are applied, bearing means disposed in said socket chamber for supporting said head portion of said ball stud, said bearing means includng a bearing seat having an inner surface area which is disposed in abutting engagement with said head portion of said ball stud and an outer surface area which is disposed in abutting engagement with the side surface of said socket chamber, and means for retaining said bearing seat against movement relative to the side surface of said socket chamber under the influence of axial load forces applied to said shank portion of side ball stud, said means for retaining said bearing seat against movement including means for applying to said bearing seat a static friction force equal to the axial load force applied to said shank portion of said ball stud.

2. A pivot joint as set forth in claim 1 wherein said head portion of said ball stud includes surface means for applying radial and axially directed force components to said bearing seat, said means for applying static friction force to said bearing seat including means for applying to said bearing seat a static friction force equal to the axially directed force component.

3. A pivot joint as set forth in claim 2 wherein said means for applying static friction force to said bearing seat includes means for applying to said bearing seat a static friction force equal to the radial force component applied to said bearing seat times the coefficient of static friction between said outer surface area of said bearing seat and the side surface of said socket chamber.

4. A pivot joint as set forth in claim 1 wherein said head portion of said ball stud has a generally spherical outer surface, the inner surface of said bearing seat having a radius of curvature which is greater than the radius of curvature of the spherical outer surface of said head portion of said ball stud.

5. A pivot joint comprising a housing defining a socket chamber having a central axis, a ball stud having a head portion disposed in said socket chamber, said head portion having a generally spherical outer surface and a center of oscillation lying on the central axis of the socket chamber, said ball stud also having a shank portion extending ouwardly from said head portion and said socket chamber, bearing means disposed in said socket chamber for supporting said head portion of said ball stud for oscillation about its center of oscillation under the influence of forces applied to said shank portion, said bearing means including a bearing seat having an annular inner surface area which is disposed in abutting engagement with said head portion of said ball stud and an outer side surface which is disposed in abutting engagement with a side surface of said socket chamber, said annular surface area of said bearing seat having a longitudinal central axis which is coincident with the central axis of said socket chamber and having a circular central axis which is disposed on said annular inner surface area at the abutting engagement with said head portion of said ball stud, said circular central axis of said annular inner surface area of said bearing seat lying in a first plane which extends parallel to and is spaced from a second plane through the center of oscillation of said head portion of said ball stud, said first plane extending perpendicular to the central axis of said socket chamber, said annular inner surface area of said bearing seat and said shank portion of said ball stud being disposed on opposite sides of said second plane, said generally spherical outer surface of said head portion of said ball stud being effective to radially transmit an axial force applied to said shank portion of said ball stud to said annular inner surface area of said bearing seat, the force transmitted from the head portion of said ball stud to said annular inner surface area of said bearing seat having a radial force component lying in said plane and extending through said circular central axis of said annular inner surface area of said bearing seat and an axial force component extending through said circular central axis of said inner surface area of said bearing seat in a direction perpendicular to said first plane, and means for retaining said bearing seat against axial movement relative to the side surface of said socket chamber under the influence of said axial force component, said means for retaining said bearing seat against axial movement including the outer side surface of said bearing seat and the side surface of said socket chamber which have a coefficient of static friction therebetween which is a least as great as the tangent of an acute angle formed between said second plane and a line extending through the center of oscillation of the head portion of said ball stud and said circular central axis of said annular inner surface area of said bearing seat so that said radial force component times said coefficient of static friction is greater than said axial force component.

6. A joint as set forth in claim 5 wherein said annular inner surface area of said bearing seat has an arucate cross section in a third plane which extends through the central axis of the socket chamber and which extends perpendicular to said first and second planes, said arcuate cross section having a center of curvature which is spaced from the center of oscillation of said head portion of said ball stud and is disposed on said line extending through the center of oscillation of the head portion of said ball stud and the circular central axis of said annular inner surface area of said bearing seat.

7. A joint as set forth in claim 6 wherein said center of curvature of said ball stud is disposed on the same side of said second plane as the shank portion of said ball stud.

8. A joint as set forth in claim 6 wherein said annular inner surface area of said bearing seat is generated by rotating said arcuate cross section about a point which is coincident with the center of oscillation of said ball stud.

9. A joint as set forth in claim 5 further including spring means for urging said annular inner surface of said bearing seat toward the head portion of said ball stud.

10. A pivot joint comprising a housing defining a socket chamber having a central axis, a ball stud having a head portion disposed in said socket chamber, said head portion having a generally spherical outer surface and a center of oscillation lying on the central axis of the socket chamber, said ball stud also having a shank portion extending outwardly from said head portion and said socket chamber, bearing means disposed in said socket chamber for supporting said head portion of said ball stud for oscillation about its center of oscillation under the influence of forces applied to said shank portion, said bearing means including a bearing seat having an outer side surface which is disposed in abutting engagement with a side surface of said socket chamber, and means for promoting a wedging action between said bearing seat and the side surface of said socket chamber to retard movement of said bearing seat relative to the side surface of said socket chamber, said means for promoting a wedging action between said bearing seat and the side surface of said socket chamber including an annular inner surface area on said bearing seat, said annular inner surface area on said bearing seat being disposed in abutting engagement with the head portion of said ball stud and having an arcuate cross section in a radial plane, said arcuate cross section having a radius of curvature which is greater than the radius of curvature of the spherical outer surface of said head portion of said ball stud to provide an anular space between the head portion of said ball stud and at least a portion of said annular inner surface area on said bearing seat, said annular space having an arcuate wedge shaped configuration and tapering toward the equator of the spherical surface of said head portion of said ball stud to promote an outward camming action between the head portion of said ball stud and said bearing seat upon the application of axial load forces to the shank portion of said ball stud.

11. A pivot joint as set forth in claim 10 wherein said means for promoting a wedging action includes means for applying to said bearing seat a static friction force which varies as a function of variations in a load force applied to the shank portion of said ball stud.

12. A pivot joint as set forth in claim 11 further including spring means disposed in said socket chamber for urging said bearing seat into engagement with the head portion of said ball stud.

13. A method of assembling a ball joint comprising the steps of providing a housing defining a socket chamber having a side surface, positioning a head portion of a ball stud in the socket chamber, engaging the head portion of the ball stud with a bearing seat having an outer side surface disposed in abutting engagement with the side surface of the socket chamber, applying a load force to the ball stud in a direction toward the bearing seat, transmitting a load force from the ball stud to the bearing seat, and at an area of abutting engagement between the outer side surface of the bearing seat and the side surface of the socket chamber, applying to the bearing seat a static friction force equal to the load force applied to the ball stud to hold the bearing seat against movement relative to the side surface of the socket chamber.

14. A method as set forth in claim 13 wherein said step of transmitting the load force to the bearing seat includes the step of applying radial and axially directed load force components to the bearing seat, said step of applying static friction force to the bearing seat including the step of applying to the bearing seat a static friction force equal to the axially directed load force component.

15. A method as set forth in claim 14 wherein said step of applying a static friction force to the bearing seat includes the step of applying to the outer side surface of the bearing seat a static friction force equal to the radial load force component applied to the bearing seat times the coefficient of static friction between the outer side surface of the bearing seat and the side surface of the socket chamber.

* * * * *

UNITED STATES PATENT AND TRADEMARK OFFICE
CERTIFICATE OF CORRECTION

PATENT NO. : 4,102,585
DATED : July 25, 1978
INVENTOR(S) : Edward John Herbenar

It is certified that error appears in the above—identified patent and that said Letters Patent are hereby corrected as shown below:

Column 9, line 11 change "ouwardly" to --outwardly--.

Column 9, line 41 insert --first-- after "said".

Signed and Sealed this

Fifteenth Day of May 1979

[SEAL]

Attest:

RUTH C. MASON
Attesting Officer

DONALD W. BANNER
Commissioner of Patents and Trademarks